(12) United States Patent
Zimprich et al.

(10) Patent No.: US 6,651,660 B2
(45) Date of Patent: Nov. 25, 2003

(54) APPARATUS FOR SUPPLYING RESPIRATORY GAS TO A PARACHUTE JUMPER

(75) Inventors: Siegfried Zimprich, Wentorf (DE); Rudiger Meckes, Berkenthin (DE); Carsten Mantey, Wulsfelde (DE); Herbert Meier, Lübeck (DE)

(73) Assignee: Dräger Aerospace GmbH, Lübeck (DE)

( * ) Notice: Subject to any disclaimer, the term of this patent is extended or adjusted under 35 U.S.C. 154(b) by 98 days.

(21) Appl. No.: 09/946,673

(22) Filed: Sep. 6, 2001

(65) Prior Publication Data

US 2002/0029777 A1 Mar. 14, 2002

(30) Foreign Application Priority Data

Sep. 12, 2000 (DE) .................................. 200 15 791 U

(51) Int. Cl.⁷ .............................. A62B 7/00; A62B 9/00
(52) U.S. Cl. .................................. 128/205.22; 128/202
(58) Field of Search ................. 128/205.22, 202.26, 128/201.24, 205.25, 202.14, 205.12, 205.28, 202.11, 201.21, 202.12, 205.26, DIG. 27

(56) References Cited

U.S. PATENT DOCUMENTS

| | | | | |
|---|---|---|---|---|
| 764,709 A | * | 7/1904 | Chapin et al. ......... | 128/205.22 |
| 2,085,249 A | * | 6/1937 | Bullard .................. | 128/205.12 |
| 2,238,759 A | * | 4/1941 | Vestrem ................. | 128/201.25 |
| 2,329,289 A | * | 9/1943 | Morehouse ............ | 128/202.13 |
| 2,406,888 A | * | 9/1946 | Meidenbauer ......... | 128/205.24 |
| 5,425,358 A | * | 6/1995 | McGrail et al. ........ | 128/205.24 |
| 5,750,077 A | * | 5/1998 | Schoen .................. | 422/122 |
| 5,944,054 A | * | 8/1999 | Saieva ................... | 137/625.4 |
| 6,070,577 A | * | 6/2000 | Troup .................... | 128/205.22 |

FOREIGN PATENT DOCUMENTS

DE     297 17 065     1/1998

* cited by examiner

*Primary Examiner*—Weilun Lo
*Assistant Examiner*—Darwin P. Erezo
(74) *Attorney, Agent, or Firm*—Walter Ottesen

(57) ABSTRACT

An apparatus for supplying respiratory gas to a parachute jumper includes a mask which can be worn by the parachute jumper and a first respiratory gas reservoir includes a pressurized-gas vessel containing respiratory gas. The pressurized-gas vessel has an adjustable metering valve for metering respiratory gas contained in the pressurized vessel. A breathing hose connects the metering valve to the mask for conducting the respiratory gas to the mask. A second respiratory-gas reservoir contains a solid-state oxygen generator and has a manually-actuable starting device for the solid-state oxygen generator. The second respiratory-gas reservoir is connected to the breathing hose.

6 Claims, 1 Drawing Sheet

APPARATUS FOR SUPPLYING RESPIRATORY GAS TO A PARACHUTE JUMPER

BACKGROUND OF THE INVENTION

An apparatus for supplying respiratory gas to a person in an aircraft is disclosed in German utility model registration 297 17 065.1. This arrangement includes a multi-directional valve which selectively supplies the respiratory gas from a pressurized-gas vessel, which is filled with respiratory gas, or from an on-board respiratory gas source. The apparatus is so configured that the person receives the respiratory gas either exclusively from the on-board respiratory gas source when this source is connected; or, alternatively, from two connected pressurized gas vessels with the switchover being dependent upon pressure.

When persons are outside of an aircraft at higher elevations of, for example, 10,000 meters and more, as is the case especially for parachute jumpers, these persons must have a mobile oxygen supply with them from which the respiratory gas is supplied during the jump. Known mobile, personal respiratory gas supply units do include a respiratory gas reservoir which is carried on the person of the parachute jumper in the form of a pressurized gas vessel; however, it has been shown that the oxygen supply can be interrupted because of a fault in respiratory gas supply units of this kind so that a hypoxia or, in the extreme case, the death of the parachute jumper can result.

Faults in known mobile, personal respiratory gas supply units occur especially in the area of the relatively complex metering valve or in the form of leaks in the region of the pressurized gas vessel.

SUMMARY OF THE INVENTION

In view of the foregoing, it is an object of the invention to provide an apparatus for supplying respiratory gas to a parachute jumper which includes a second respiratory gas reservoir independent of the first respiratory gas reservoir.

The apparatus of the invention is for supplying respiratory gas to a parachute jumper and includes: a mask which can be worn by the parachute jumper; a first respiratory gas reservoir including a pressurized-gas vessel containing respiratory gas; the pressurized-gas vessel having an adjustable metering valve for metering respiratory gas contained in the pressurized-gas vessel; a breathing hose connecting the metering valve to the mask for conducting the respiratory gas thereto; a second respiratory-gas reservoir containing a solid-state oxygen generator and having a manually-actuable starting device for the solid-state oxygen generator; and, the second respiratory-gas reservoir being connected to the breathing hose.

A significant advantage of the apparatus of the invention lies in the combination of the two respiratory gas reservoirs which are independent of each other and function differently. The second respiratory gas reservoir is characterized by the especially compact and light construction of the solid-state oxygen generator. At the same time, this compact construction affords the additional advantage that, if needed, a redundant arrangement for the supply of respiratory gas is available which can supply a constant oxygen flow over a time span of approximately 30 minutes which is required for the jump of a parachute jumper from high elevations.

BRIEF DESCRIPTION OF THE DRAWINGS

The invention will now be described with reference to the single FIGURE (FIG. 1) of the drawing which schematically shows an embodiment of the apparatus of the invention for supplying respiratory gas to a parachute jumper.

DESCRIPTION OF THE PREFERRED EMBODIMENTS OF THE INVENTION

Figure 1:
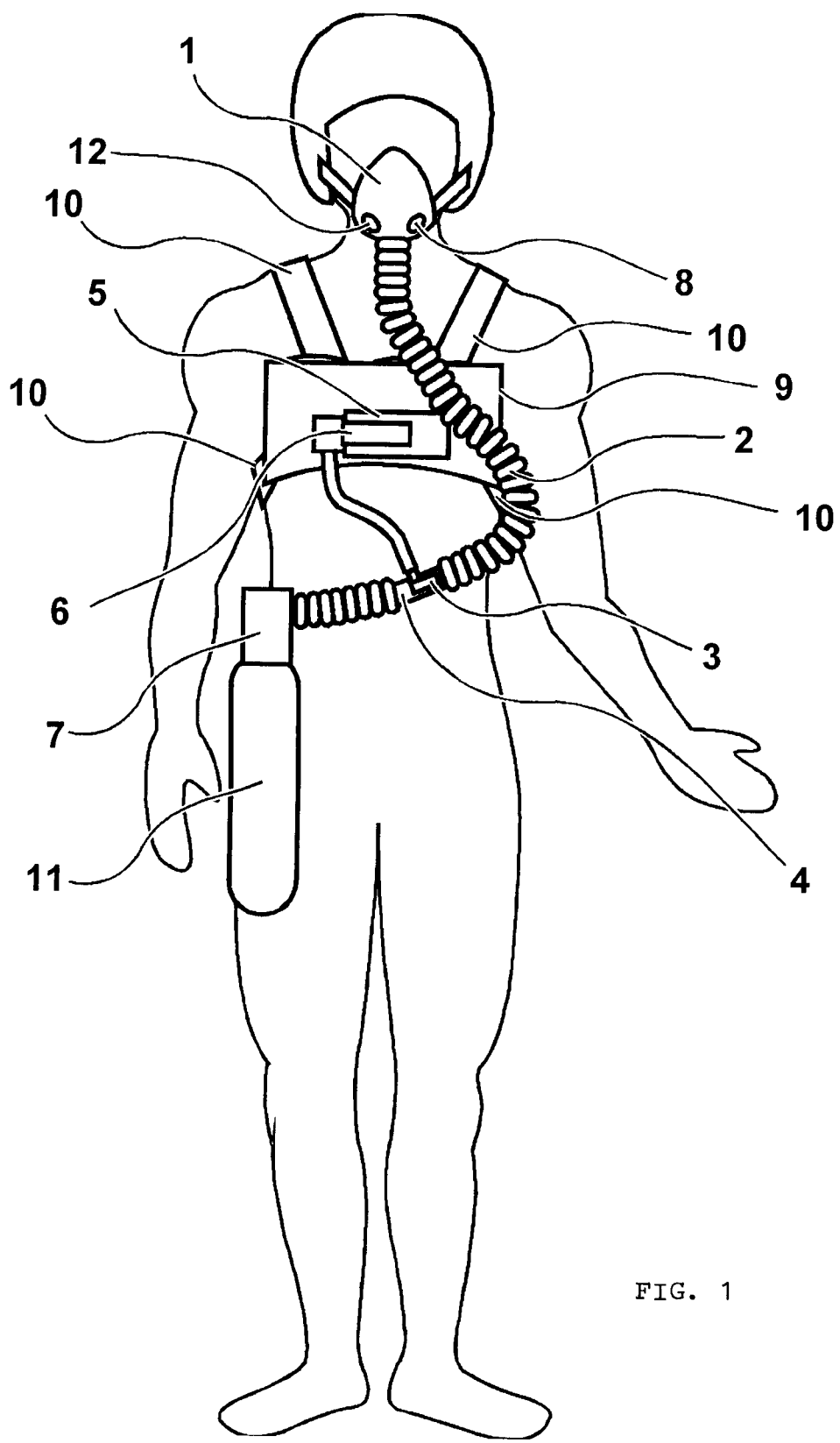

FIG. 1 shows the outline of a parachute jumper having a helmet with a breathing mask 1 and having an apparatus according to the invention. The breathing mask 1 is especially a half mask known per se having an exhalation valve 12. The breathing mask 1 further includes an anti-suffocation valve 8 which opens to the ambient at a specific underpressure, such as −3 millibar, in order to make possible a mixture of inhalation air and ambient air especially for heavy spontaneous breathing. The breathing tube 2 is connected directly to the breathing mask and this breathing tube connects the breathing mask 1 to the metering valve 7 of the pressurized gas vessel 11. The metering valve 7 is, as a rule, manually adjustable and the pressurized gas vessel 11 is configured to have the form of a bottle and contains respiratory gas, especially oxygen. A pressure-limiting valve 3 is arranged in the breathing tube 2 to protect the parachute jumper. The pressure-limiting valve 3 limits the respiratory gas pressure to a maximum pressure of, for example, 3 millibar for the case of a system fault.

A T-piece 4 is arranged in the lower region of the breathing tube 2 and has a branching tube to the output of the solid-state oxygen generator 5. The oxygen in the solid-state oxygen generator 5 is chemically bonded, especially in the form of sodium chlorate. Solid-state oxygen generators 5 of this kind are also known as chlorate candles and are known, inter alia, for supplying emergency oxygen in commercial aircraft. The solid-state oxygen generators 5 can be so configured with respect to the chlorate mixture that, in dependence upon the elevation, an oxygen generation is ensured as soon as the solid-state oxygen generator 5 is manually ignited with the aid of a starting device 6, that is, the oxygen liberating or releasing reaction is triggered. This oxygen supply is adapted to the oxygen content of the ambient and is adequate for the oxygen supply of the parachute jumper. The main branch of the breathing tube 2 is connected directly to the output of the metering valve 7 of the pressurized gas vessel 11 filled with respiratory gas or oxygen.

Under normal circumstances, the supply for the parachute jumper is provided via the manually adjustable metering valve 7. Should the respiratory gas supply via the metering valve 7 collapse in the case of a fault, the parachute jumper must simply manually actuate the starting device 6 of the solid-state oxygen generator 5. The oxygen, which is generated thereby via chemical reaction, flows into the breathing tube 2 and supplies the breathing mask 1 of the jumper. Excess oxygen flows to the ambient via the pressure-limiting valve 3.

The solid-state oxygen generator 5 having the manually actuable starting device 6 is disposed in a carrier 9 carried on the chest of the parachute jumper. The carrier 9 is carried by suitable carrier straps 10 on the body of the parachute jumper. In the embodiment shown, the carrier 9 has four carrier straps 10 of which two extend over the shoulders and two over the thorax and run together in the region of the back.

It is understood that the foregoing description is that of the preferred embodiments of the invention and that various changes and modifications may be made thereto without departing from the spirit and scope of the invention as defined in the appended claims.

What is claimed is:

1. An apparatus for supplying respiratory gas to a parachute jumper, the apparatus comprising:

a mask which can be worn by the parachute jumper;

a first respiratory gas reservoir including a pressurized-gas vessel containing respiratory gas;

said pressurized-gas vessel having an adjustable metering valve for metering respiratory gas contained in said pressurized-gas vessel;

a breathing hose connecting said metering valve to said mask for conducting the respiratory gas thereto;

a second respiratory-gas reservoir containing a solid-state oxygen generator and having a manually-actuable starting device for said solid-state oxygen generator;

said second respiratory-gas reservoir being connected to said breathing hose; and, said manually-actuable starting device functioning to trigger a chemical reaction to produce a gaseous flow of oxygen flowing from said solid-state oxygen generator to said mask via said breathing hose.

2. The apparatus of claim 1, further comprising a pressure-limiting valve mounted in said breathing hose for venting to atmosphere in response to a predetermined overpressure.

3. The apparatus of claim 1, wherein said solid-state generator consists essentially of an alkali metal chlorate.

4. The apparatus of claim 1, wherein said solid-state generator consists essentially of sodium chlorate or potassium chlorate.

5. The arrangement of claim 1, further comprising a holder; said solid-state oxygen generator with said manually-actuable starting device being disposed in said holder; and, a plurality of carrying straps connected to said holder to facilitate carrying said holder by the parachute jumper.

6. The arrangement of claim 5, said plurality of straps including two straps for placement over the shoulders of the parachute jumper and two straps for placement about the thorax of the parachute jumper.

* * * * *